May 10, 1927.
C. WARNER
1,628,086
ELECTRICAL APPARATUS
Filed Nov. 15, 1923
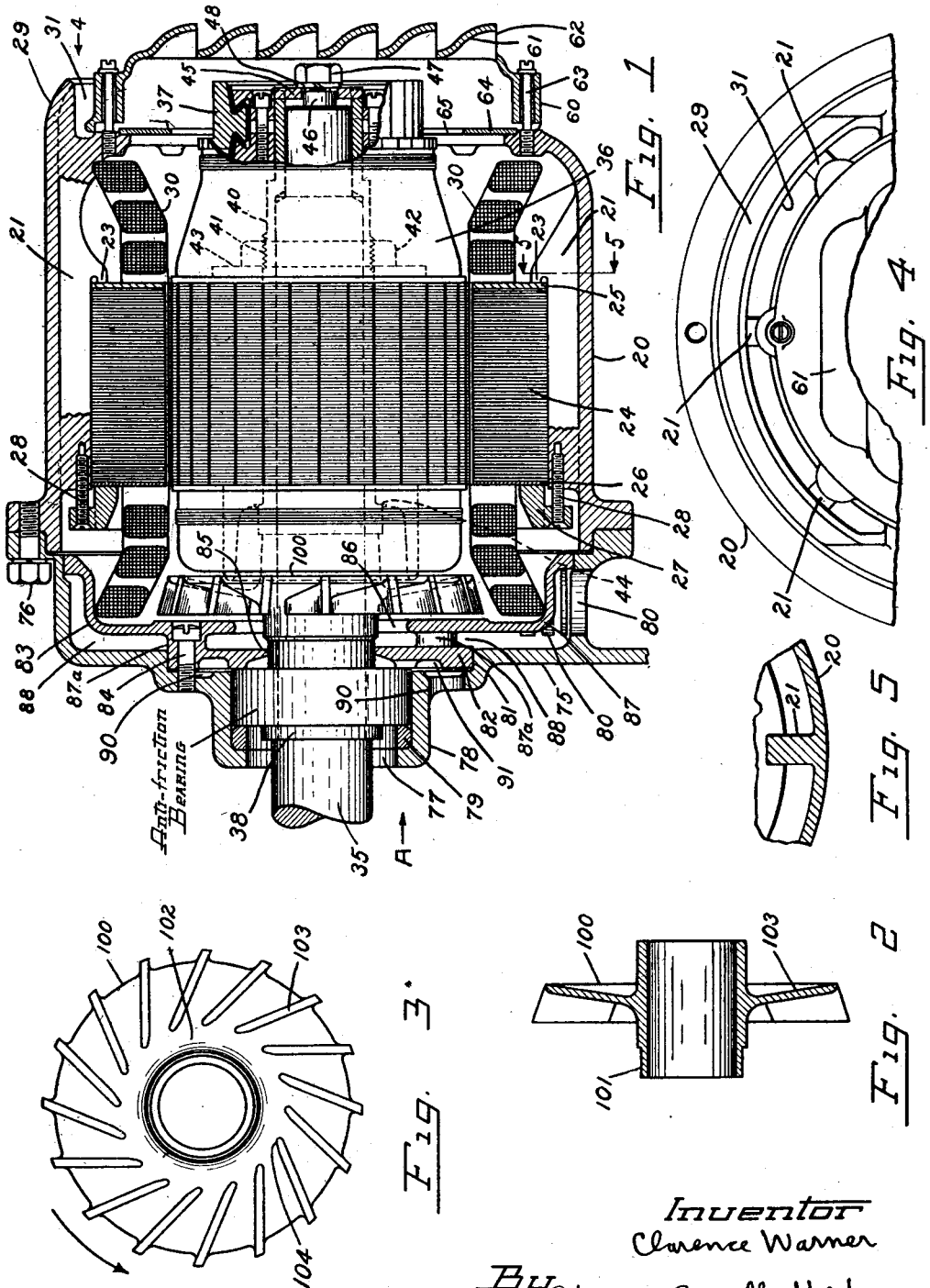
Inventor
Clarence Warner
By Spencer, Sewell + Hardman
His Attorney Patented May 10, 1927.

1,628,086

UNITED STATES PATENT OFFICE.

CLARENCE WARNER, OF DAYTON, OHIO, ASSIGNOR TO DELCO-LIGHT COMPANY, OF DAYTON, OHIO, A CORPORATION OF DELAWARE.

ELECTRICAL APPARATUS.

Application filed November 15, 1923. Serial No. 675,003.

This invention relates to cooling apparatus for electric motors, and has for its object to secure the greatest possible cooling efficiency with the least number of parts compactly arranged.

Further objects and advantages of the present invention will be apparent from the following description, reference being had to the accompanying drawings, wherein a preferred form of embodiment of the present invention is clearly shown.

In the drawings:

Fig. 1 is a view partly in section and partly in elevation of an electric motor embodying the present invention.

Fig. 2 is a vertical sectional view of the cooling fan.

Fig. 3 is a view of the fan looking in the direction of the arrow A in Fig. 1.

Fig. 4 is a fragmentary view in elevation looking in the direction of arrow 4 in Fig. 1.

Fig. 5 is a sectional view taken on line 5—5 of Fig. 1.

Referring to the drawings, a flanged motor frame 20 is adapted to be secured to a flanged wall 75 of a gear housing or other support by bolts 76. Frame 20 is provided with a series of spaced ribs 21, preferably eight in number, extending inwardly from said frame and having nose portions 23. Field laminations 24 and end plates 25 and 26 are supported by ribs 21 and are held in position thereon by clamping ring 27 bearing against end plate 26 and being secured to the ribs 21 by screws 28. End plate 25 bears against the nose portions 23. Field coils 30 are provided about the field laminations 24 in the usual manner.

A motor shaft 35 extends from the gear housing through an opening 77 in wall 75 thereof into the motor frame 20, and supports between the field coils 30 and laminations 24, an armature 36 and a commutator 37. An anti-friction bearing for motor shaft 35 is supported within the retaining portion 78 of wall 75, the inner race of said bearing abutting against a collar 38 on shaft 35 and the outer race thereof abutting a spacing ring 79 in retaining portion 78. Armature 36 is mounted on a sleeve 40 which is removable from shaft 35. Sleeve 40 is threaded as at 41 for receiving a nut 42 which together with washer 43 clamps the core of the armature against the shoulder 44 on sleeve 40. A washer 45 provided with flats on its inner periphery is received by a reduced end portion 46 of motor shaft 35 which is also provided with corresponding flats. Ears on washer 45 engage slots in the end of the sleeve, thus forming a driving connection between sleeve 40 and shaft 35.

A peripheral discharge fan 100, provided with a hub 101 and having a central intake portion 102 and angularly disposed vanes 103, is mounted on the motor shaft 35 between the anti-friction bearing and the armature 36, one end of the hub 101 bearing against the inner race of the bearing, and the other end of hub bearing against one end of sleeve 40. A nut 47 having threaded engagement with the end of motor shaft 35 causes lock washer 48 to bear against washer 45, thus clamping the fan hub 101 between the anti-friction bearing and the sleeve 40 and causing fan 100 to rotate with sleeve 40 and shaft 35. Shaft 35 may be provided with a bearing and a flywheel (not shown) at its opposite end, and with a worm or other suitable driving connections intermediate the anti-friction bearing and the flywheel for operating a suitable work device, such as disclosed in the copending application of Kettering and Buvinger, Serial No. 624,323, filed March 12, 1923.

Motor frame 20 is provided with an overhanging portion 29 having a semi-circular opening 31 connecting with the passages between the ribs 21 inside the motor frame 20.

End frame 60, provided with louvres 61, forming openings 62, is secured to frame 20 by non-loosable bolts 63, and provides an enclosure for the commutator end of the armature 36. Brush mounting plate 64 is secured to the frame 20 by screws (not shown) and is provided with a central circular opening 65 through which the commutator 37 extends.

Flanged wall 75 is provided with a series of spaced air inlet openings 80 in the lower portion thereof. Wall 75 is also provided with an annular recess 81 for receiving a circular wall 82 of a cup-shaped frame or baffle 83, which is secured thereto by screws 84. Wall 82 bears against the outer race of the anti-friction bearing and serves as a retainer therefor. Frame 83 is provided with alined openings 85 and 86 through which the shaft 35 and fan hub 101 pass, there being a slight clearance between the opening 85 and the hub 101, the opening 86 being somewhat larger than the outside diameter of hub 101 to provide an air inlet for fan 100. Wall 87 of frame 83, which is spaced from wall 82 by spacers 87ª, forms a passage 88 which connects the air inlet openings 80 with the intake portion 102 of fan 100 through opening 86 in wall 87. Wall 87 prevents the peripherally discharged air from fan 100 escaping back through openings 80, and serves to deflect the discharged air along the field coils 30. Duct 90 in wall 75 cooperates with duct 91 in wall 82 to provide an oil return from the anti-friction bearing and the fan hub 101 to the gear housing.

Mode of operation.

Upon operation of the fan 100 in a counterclockwise direction, as viewed in Fig. 3, air will be drawn through openings 80 into passage 88, through opening 86 in wall 87 to the intake portion 102 of fan 100. The air will be swirled about the central portion 102 and deflected toward the periphery of the fan by the side surfaces 104 of the angularly disposed vanes 93. Air emerging from fan 100 will be deflected along coils 30 by wall 87 and pressure will be built up within the motor frame 20. Air will be forced around one end of coils 30 and through the passages between the ribs 21, about the opposite ends of coils 30, through opening 65 in brush plate 64 and through openings 62 in end frame 60 to the outside atmosphere. Some air will be forced out through the opening 31 which connects the passages between ribs 21 adjacent the top of frame 20, as viewed in Fig. 1. This forced current of air flowing through the motor frame 20 will tend to keep cool the coils 30 and field laminations 24, as well as the commutator 37 and the brush structure (not shown).

While the form of embodiment of the present invention as herein disclosed, constitutes a preferred form, it is to be understood that other forms might be adopted, all coming within the scope of the claims which follow.

What is claimed is as follows:

1. An electric motor comprising, in combination, a motor field frame, a motor shaft and an armature, a supporting frame for said motor frame provided with air inlet openings, a bearing for said shaft mounted within the supporting frame, a peripheral discharge fan mounted on the shaft between the bearing and armature, a baffle between the fan and supporting frame serving as a retainer for said bearing and providing a passage from the air inlet openings to the fan intake.

2. An electric motor comprising, in combination, a motor shaft, a sleeve removably supported upon the shaft, an armature core mounted on the sleeve, means for securing the core to said sleeve, a bearing for the shaft having a portion rotatable with the shaft, a fan loosely mounted on the shaft, and means for locking the sleeve to the shaft and for clamping the fan between the sleeve and the rotatable portion of the bearing.

3. An electric motor comprising in combination, a supporting frame, a bearing in said frame, a shaft journaled in said bearing, a cooling fan for the motor carried by said shaft, and means for securing the bearing in position including an air directing baffle.

4. An electric motor comprising in combination, a supporting frame having a shoulder, a bearing in said frame having inner and outer races, said outer race abutting the shoulder, a shaft secured to the inner race, a cooling fan for the motor carried by said shaft, and means for securing the bearing in position including an air directing baffle for clamping said outer race against the shoulder.

5. An electric motor comprising in combination, a field frame carrying windings which extend longitudinally beyond one end of the frame, a cup-shaped end frame inclosing the field windings and providing a bearing recess centrally thereof, and having openings in the side thereof, a shaft bearing located within said recess, a shaft supported by said bearing, a cup-shaped member located within the end frame and closely adjacent the field windings and having end and side walls spaced from the end and side walls of the end frame, and having an opening for receiving the shaft, a fan enclosed by said member and located adjacent the central opening thereof, and a bearing-retaining plate integral with the cup-shaped member and spaced from the end wall thereof to space the latter from the end wall of the end frame when said retaining plate is secured to the end wall of the end frame member.

In testimony whereof I hereto affix my signature.

CLARENCE WARNER.